(12) United States Patent
Mercer et al.

(10) Patent No.: US 7,590,659 B2
(45) Date of Patent: *Sep. 15, 2009

(54) ADAPTIVE MENU SYSTEM FOR MEDIA PLAYERS

(75) Inventors: Ian Cameron Mercer, Sammamish, WA (US); Kevin Leigh LaChapelle, Redmond, WA (US); Harutoshi Miyamoto, Ibaraki (JP); Yoshifumi Yanagawa, Kyoto (JP); Chiyoko Matsumi, Suita (JP); Nobuyasu Takeguchi, Kawachinagano (JP); Yasuyuki Torii, Yawata (JP)

(73) Assignees: Microsoft Corporation, Redmond, WA (US); Matsushita Electric Industrial Co., Ltd., Osaka (JP)

( * ) Notice: Subject to any disclaimer, the term of this patent is extended or adjusted under 35 U.S.C. 154(b) by 137 days.

This patent is subject to a terminal disclaimer.

(21) Appl. No.: 11/333,500

(22) Filed: Jan. 17, 2006

(65) Prior Publication Data

US 2006/0123058 A1 Jun. 8, 2006

Related U.S. Application Data

(63) Continuation of application No. 10/273,411, filed on Oct. 17, 2002, now Pat. No. 7,136,874.

(60) Provisional application No. 60/418,973, filed on Oct. 16, 2002.

(51) Int. Cl.
*G06F 17/00* (2006.01)
(52) U.S. Cl. .................... 707/104.1; 707/101; 707/102; 707/103 Y

(58) Field of Classification Search .................. 707/10, 707/102, 104.1, 511, 1, 3, 101, 103 Y; 715/500.1; 725/134; 345/738, 589; 713/182
See application file for complete search history.

(56) References Cited

U.S. PATENT DOCUMENTS 5,428,732 A 6/1995 Hancock et al.

(Continued)

FOREIGN PATENT DOCUMENTS

EP 1288942 A1 3/2003

(Continued)

OTHER PUBLICATIONS

T.D.C. Little et al., "A Digital On-Demand Video Service Supporting Content-Based Queries", ACM, Sep. 1993, pp. 1-9.*

(Continued)

*Primary Examiner*—Thuy N Pardo
(74) *Attorney, Agent, or Firm*—Senniger Powers LLP

(57) ABSTRACT

Creating and displaying an adaptive menu structure for media files. The invention includes authoring software to create the menu structure to enable a user to navigate the media files using a media player. The invention also includes filtering software to adapt the created menu structure to display menu information on a display associated with the media player as a function of a media type associated with the media player. In one embodiment, the invention is operable as part of a compressed media format having a set of small files containing metadata, menus, and playlists in a compiled binary format designed for playback on feature-rich personal computer media players as well as low cost media players.

11 Claims, 10 Drawing Sheets

U.S. PATENT DOCUMENTS

| | | | |
|---|---|---|---|
| 5,616,876 A | | 4/1997 | Cluts |
| 5,708,845 A | * | 1/1998 | Wistendahl et al. ...... 715/500.1 |
| 5,742,347 A | | 4/1998 | Kandlur et al. |
| 5,832,495 A | | 11/1998 | Gustman |
| 5,870,553 A | | 2/1999 | Shaw et al. |
| 5,892,535 A | | 4/1999 | Allen et al. |
| 5,907,704 A | * | 5/1999 | Gudmundson et al. ...... 717/100 |
| 5,929,857 A | * | 7/1999 | Dinallo et al. ............... 715/840 |
| 5,996,015 A | | 11/1999 | Day et al. |
| 6,006,234 A | | 12/1999 | Govindarajan et al. |
| 6,201,540 B1 | | 3/2001 | Gallup et al. |
| 6,275,935 B1 | * | 8/2001 | Barlow et al. ................ 713/182 |
| 6,356,921 B1 | | 3/2002 | Kumar et al. |
| 6,484,156 B1 | | 11/2002 | Gupta et al. |
| 6,526,411 B1 | | 2/2003 | Ward |
| 6,557,042 B1 | | 4/2003 | He et al. |
| 6,657,117 B2 | | 12/2003 | Weare et al. |
| 6,661,437 B1 | | 12/2003 | Miller et al. |
| 6,721,489 B1 | | 4/2004 | Benyamin et al. |
| 6,728,729 B1 | | 4/2004 | Jawa et al. |
| 6,735,628 B2 | | 5/2004 | Eyal |
| 6,760,721 B1 | | 7/2004 | Chasen et al. |
| 6,839,059 B1 | | 1/2005 | Anderson et al. |
| 6,865,431 B1 | | 3/2005 | Hirota et al. |
| 6,898,799 B1 | | 5/2005 | Jarman |
| 6,910,049 B2 | * | 6/2005 | Fenton et al. ............. 707/104.1 |
| 7,075,550 B2 | * | 7/2006 | Bonadio ..................... 345/589 |
| 7,149,983 B1 | | 12/2006 | Robertson et al. |
| 2001/0001160 A1 | | 5/2001 | Shoff et al. |
| 2001/0011284 A1 | * | 8/2001 | Humpleman et al. ........ 707/511 |
| 2002/0026521 A1 | | 2/2002 | Sharfman et al. |
| 2002/0033844 A1 | | 3/2002 | Levy et al. |
| 2002/0078144 A1 | | 6/2002 | Lamkin et al. |
| 2002/0082730 A1 | | 6/2002 | Capps et al. |
| 2002/0122137 A1 | | 9/2002 | Chen et al. |
| 2002/0151363 A1 | | 10/2002 | Letovsky et al. |
| 2002/0161911 A1 | | 10/2002 | Pinckney, III et al. |
| 2002/0172495 A1 | | 11/2002 | Han |
| 2002/0180803 A1 | | 12/2002 | Kaplan et al. |
| 2003/0009452 A1 | | 1/2003 | O'Rourke et al. |
| 2003/0016950 A1 | | 1/2003 | Ando et al. |
| 2003/0023975 A1 | | 1/2003 | Schrader et al. |
| 2003/0108335 A1 | | 6/2003 | Nakamura et al. |
| 2003/0146915 A1 | | 8/2003 | Brook et al. |
| 2003/0151618 A1 | | 8/2003 | Johnson et al. |
| 2003/0156119 A1 | * | 8/2003 | Bonadio ..................... 345/589 |
| 2003/0192044 A1 | | 10/2003 | Huntsman |
| 2004/0001106 A1 | | 1/2004 | Deutscher et al. |
| 2004/0003398 A1 | | 1/2004 | Donian et al. |
| 2004/0044724 A1 | | 3/2004 | Bell et al. |
| 2004/0064476 A1 | | 4/2004 | Rounds |
| 2004/0143590 A1 | | 7/2004 | Wong et al. |
| 2004/0143598 A1 | | 7/2004 | Drucker et al. |
| 2004/0143604 A1 | | 7/2004 | Glenner et al. |
| 2004/0167890 A1 | | 8/2004 | Eyal |
| 2004/0177319 A1 | | 9/2004 | Horn |
| 2004/0189694 A1 | * | 9/2004 | Kurtz et al. .................. 345/738 |
| 2004/0236568 A1 | | 11/2004 | Guillen et al. |
| 2006/0036568 A1 | * | 2/2006 | Moore et al. .................... 707/1 |
| 2007/0198575 A1 | * | 8/2007 | Tabellion et al. ............ 707/102 |
| 2007/0220580 A1 | * | 9/2007 | Putterman et al. ........... 725/134 |

FOREIGN PATENT DOCUMENTS

| | | |
|---|---|---|
| JP | 05-325500 | 12/1993 |
| JP | 2001338459 | 12/2001 |
| WO | WO 01/28222 A2 | 4/2001 |
| WO | WO 03/023781 A1 | 3/2003 |

OTHER PUBLICATIONS

Mei Kobayashi et al., "Information Retrieval on the Web", ACM, Jun. 2000, pp. 144-173.*

Daniel Lazenby, "GNUPro toolkit for Linux V1.0", Linux Journal, Oct. 1999, p. 1.*

Hu at al., "Multimedia Description Framework (MDF) for content description of Audio/Video Documents," Proceedings of the fourth ACM conference on Digital libraries, 1999, pp. 67-75, ACM Press. New York, U.S.A.

Mueller, "Mediacaptain—an Interface for Browsing Streaming Media," Proceedings of the eighth ACM international conference on Multimedia, 2000, p. 419-421, ACM Press, New York, U.S.A.

Crossen et al., "Flytrap: Intelligent Group Music Recommendation," Proceedings of the 7th international conference on Intelligent user interfaces, 2002, pp. 184-185, ACM Press, New York, U.S.A.

Dunne at al., "mpMEI: Music Recommendation and Exploration," Proceedings of the 7th international conference on Intelligent user interfaces, 2002, p. 235, ACM Press, New York, U.S.A.

* cited by examiner

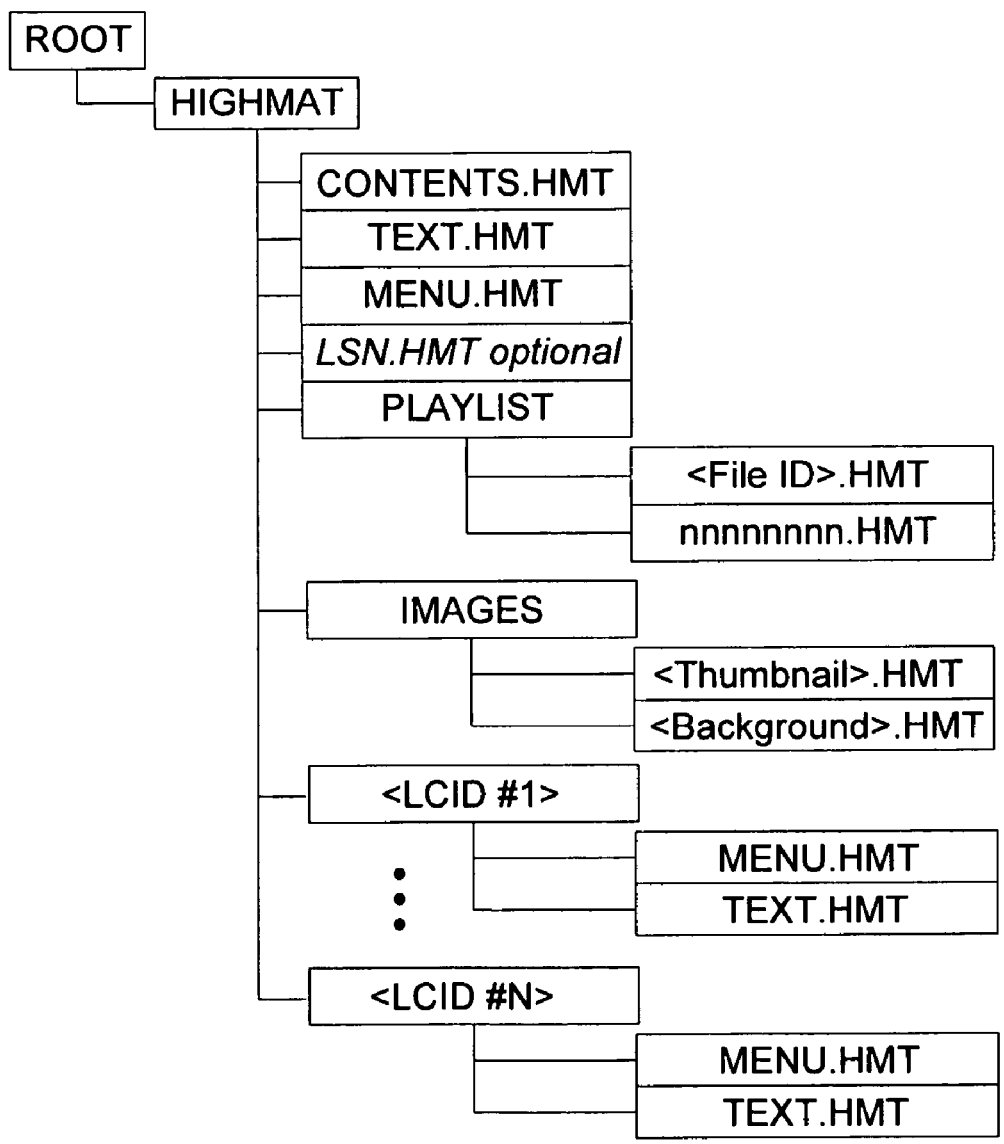
FIG. A1

ADAPTIVE MENU SYSTEM FOR MEDIA PLAYERS

CROSS-REFERENCE TO RELATED APPLICATION

This application is based upon non-provisional patent application Ser. No. 10/273,411, entitled "ADAPTIVE MENU SYSTEM FOR MEDIA PLAYERS," filed Oct. 17, 2002, which is based upon a U.S. Provisional Patent Application entitled "COMPRESSED MEDIA FORMAT SPECIFICATION," filed Oct. 16, 2002, naming Mercer et al. as inventors. The entirety of such patent applications are incorporated by reference herein.

TECHNICAL FIELD

The present invention relates to the field of digital media content. In particular, this invention relates to creating and reading an adaptive menu system for use with media players.

BACKGROUND OF THE INVENTION

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

Consumer electronic devices such as portable CD players, DVD players and car receivers have widely varying capabilities in terms of media playback and user interface capabilities. Some devices are capable of displaying images and video data while some can only play back audio data. Some devices such as DVD players have graphical displays and can display complex menus with background images and thumbnails while others such as portable CD players have only simple buttons like Play, Next, Previous, and Stop with a single line liquid crystal display (LCD) with no graphical capabilities. As such, when a user stores compressed media files such as Moving Picture Experts Group audio layer-3 (MP3) files, WINDOWS MEDIA technologies audio (WMA) files, or Joint Photographic Experts Group (JPEG) files on a computer-readable medium, the user often does not know all the playback device types that will be employed to render the stored compressed media files. For example, the user may purchase a new playback device at a later time with different capabilities from an existing media player and want to play back a previously-created computer-readable medium.

For these reasons, a system for an adaptive menu structure is desired to address one or more of these and other disadvantages.

SUMMARY OF THE INVENTION

The invention includes software and data structures for creating an adaptive menu structure associated with one or more media files. In particular, the invention includes an adaptive menu system whereby menu items are selectively hidden depending on the capabilities of a media player. The menu system of the invention can be a rich graphical display with thumbnail images on a television screen or can be represented as a simple one-option-at-a-time menu on a single line LCD display. In one embodiment, the invention is operable as part of a compressed media format having a set of small files containing metadata, menus, and playlists in a compiled binary format designed for playback on feature-rich personal computer media players as well as low cost media players. The format encompasses audio, still images, and video in various formats.

In accordance with one aspect of the invention, a method organizes one or more media files to enable a user to navigate the media files using a media player. The media files each have a media type associated therewith and are adapted for rendering by the media player as a function of the media type. The media player also has a media type associated therewith. The method includes creating a menu header. The method also includes populating the created menu header with references to one or more selected media files. The method also includes identifying a media type associated with each of the selected media files and populating the menu header with the identified media types. A media player uses the populated menu header to filter the selected media files as a function of a media type associated with the media player.

In accordance with another aspect of the invention, one or more computer-readable media in a media authoring tool have computer-executable components for organizing one or more media files to enable a user to navigate the media files using a media player. The media files each have a media type associated therewith and are adapted for rendering by the media player as a function of the media type. The media player also has a media type associated therewith. The components include an initialization module for creating a menu header. The components also include a playlist module for populating the created menu header from the initialization module with references to selected media files. The components also include a summary module for identifying a media type associated with each of the selected media files from the playlist module. The components also include a propagation module for populating the menu header with the identified media types from the summary module. A media player uses the populated menu header to filter the selected media files as a function of a media type associated with the media player.

In accordance with yet another aspect of the invention, a method displays menu information on a display associated with a media player. The menu information enables a user to navigate one or more media files using the media player. The media files each have a media type associated therewith and are adapted for rendering by the media player as a function of the media type. The media player also has a media type associated therewith. The method reads a menu header having references to selected media files and a media type associated with each respective one of the selected media files. The method also adapts the read menu header by filtering the references to the selected media files as a function of a media type associated with a media player. The method also displays menu information from the adapted menu header to a user on a display associated with the media player.

In accordance with still another aspect of the invention, a media player displays menu information on a display associated with the media player. The menu information enables a user to navigate one or more media files using the media player. The media files each have a media type associated therewith and are adapted for rendering by the media player as a function of the media type. The media player also has a media type associated therewith. The media player includes an input module for reading a menu header having references to one or more selected media files and a media type associated with each respective one of the selected media files. The media player also includes a menu module for adapting the read menu header from the input module by filtering the references to the selected media files as a function of a media type associated with a media player. The media player also includes a user interface module for displaying menu information from the adapted menu header from the menu module to a user on a display associated with the media player.

In accordance with yet another aspect of the invention, a computer-readable medium has stored thereon a data structure representing an organization of one or more media files. The media files each have a media type associated therewith and are adapted for rendering by a media player as a function of the media type. The media player has a media type associated therewith. The data structure enables a user to navigate the media files using the media player. The data structure includes a playlist field storing a reference to one or more selected media files. The selected media files each have a media type associated therewith. The data structure also includes a summary field storing the media type for one of the selected media files referenced in the playlist field. A media player uses the data structure to filter the selected media files as a function of a media type associated with the media player.

Alternatively, the invention may comprise various other methods and apparatuses.

Other features will be in part apparent and in part pointed out hereinafter.

Figure 1:
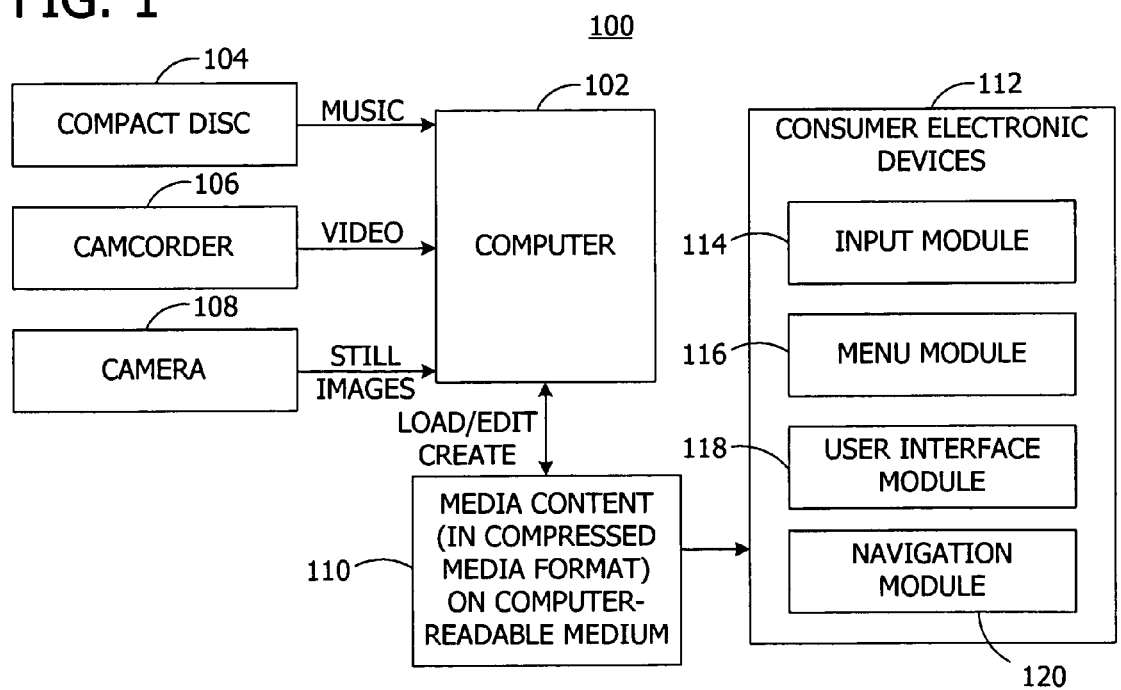
FIG. 1 is a block diagram illustrating one example of a suitable media environment in which the invention may be implemented.

FIG. A1 is a block diagram illustrating a file system in an exemplary compressed media format for use with the invention software.

Corresponding reference characters indicate corresponding parts throughout the drawings.

DETAILED DESCRIPTION OF THE INVENTION

The invention includes authoring software to create a menu structure to enable a user to navigate one or more media files using a media player. The invention also includes filtering software to adapt the created menu structure to display menu information on a display associated with the media player as a function of a media type associated with the media player. In one embodiment, the invention software is operable as part of a compressed media format (see FIG. 10) having a set of small files containing metadata, menus, and playlists in a compiled binary format designed for playback on feature-rich personal computer media players as well as low cost media players. For example, a typical low-end portable CD player might have as little as one hundred kilobytes of working memory, an eight-bit central processing unit running at only one megahertz and a very slow CD-drive mechanism with a maximum seek time of nearly five seconds.

Media Environment

Referring now to the drawings, FIG. 1 illustrates an exemplary multimedia environment in which the invention can be used. A system 100 has one or more computers 102 coupled to one or more devices providing media content. For example, the devices may include a CD 104, a camcorder 106, or a camera 108.

In one embodiment, the computer 102 stores media content on a computer-readable medium 110 for use by a media player program associated with a consumer electronic device 112. The consumer electronic device 112 includes any suitable rendering filter or media player or device that is configured to render digital media so that the user can experience the content that is embodied on the medium 110. For example, suitable media player applications include a CD media player and a DVD media player.

In the invention, the media players, consumer electronic devices 112, or the like may be organized into three exemplary levels according to the capabilities of the media player. Each media player has a media type that identifies the type of media that the media player is capable of rendering. For example, the media type (also referred to as a playlist summary type, a menu summary type, or the like) includes one or more of the following: audio, video, and still image. Level 1 media players include audio-only players such as portable CD players, car receivers, and DVD players. In addition to Level 1 media players, level 2 media players include audio and still image capable players including portable and set-top DVD players optionally capable of rendering images with audio simultaneously. Level 3 media players include level 2 media players and audio, still image, and video capable players. Exemplary consumer electronic devices 112 include, but are not limited to, the following: a portable CD player, an MP3 player, an audio system in an automobile, a personal digital assistant, a cellular telephone, or the like.

The software and data structures of the invention are operable in systems including, but not limited to, media players and media authoring systems. A media player according to the invention includes software displaying menu information on a display associated with the media player. An exemplary consumer electronic device 112 or media player includes an input module 114, a menu module 116, a user interface module 118, and a navigation module 120. The input module 114 reads a menu header having references to selected media files and a media type associated with each respective one of the selected media files. For example, the media files and menu header are stored on a computer-readable medium. The media files are adapted for rendering by the media player as a function of the media type. The menu module 116 adapts the read menu header by filtering the references to the selected media files as a function of a media type associated with the media player. The user interface module 118 displays menu information from the adapted menu header to the user on a display associated with the media player. In one embodiment, the menu header includes a reference to at least one other menu header and a media type associated with the other menu header to enable navigation between the menu headers. The navigation module 120 adapts the read menu header by filtering the reference to the other menu header as a function of the media type associated with the media player.

Playlists

A playlist is a convenient way to organize groups of audio, video, and image files on a computer-readable medium. The playlist may include, but is not limited to, one or more of the following: a media file, a group of audio files, a group of video files, a group of timed image sequences, and a group of various complex parallel combinations of images with audio or video. For example, a user may create playlists for different performers or different kinds of music or videos. The user also can manipulate the created playlists by shuffling or repeating the playlists. Playlists allow the user to easily view a listing of media files to sort, search, and quickly navigate.

Authoring Software

The invention software is operable across a range of players and media types. For instance, a computer-readable medium containing audio and photographs offers audio playback capabilities in an audio-only portable CD player. To support this capability each menu item within an accelerator file is tagged with the types of content that it includes (e.g., audio, still images, video). During creation of the medium, these tags are propagated up through the menu tree so that at any level, every item is tagged to show all the kinds of media that it contains. Using this tag, the player can filter the menus according to its capabilities and display only the menu items and playlists that it can render.

Figure 2:
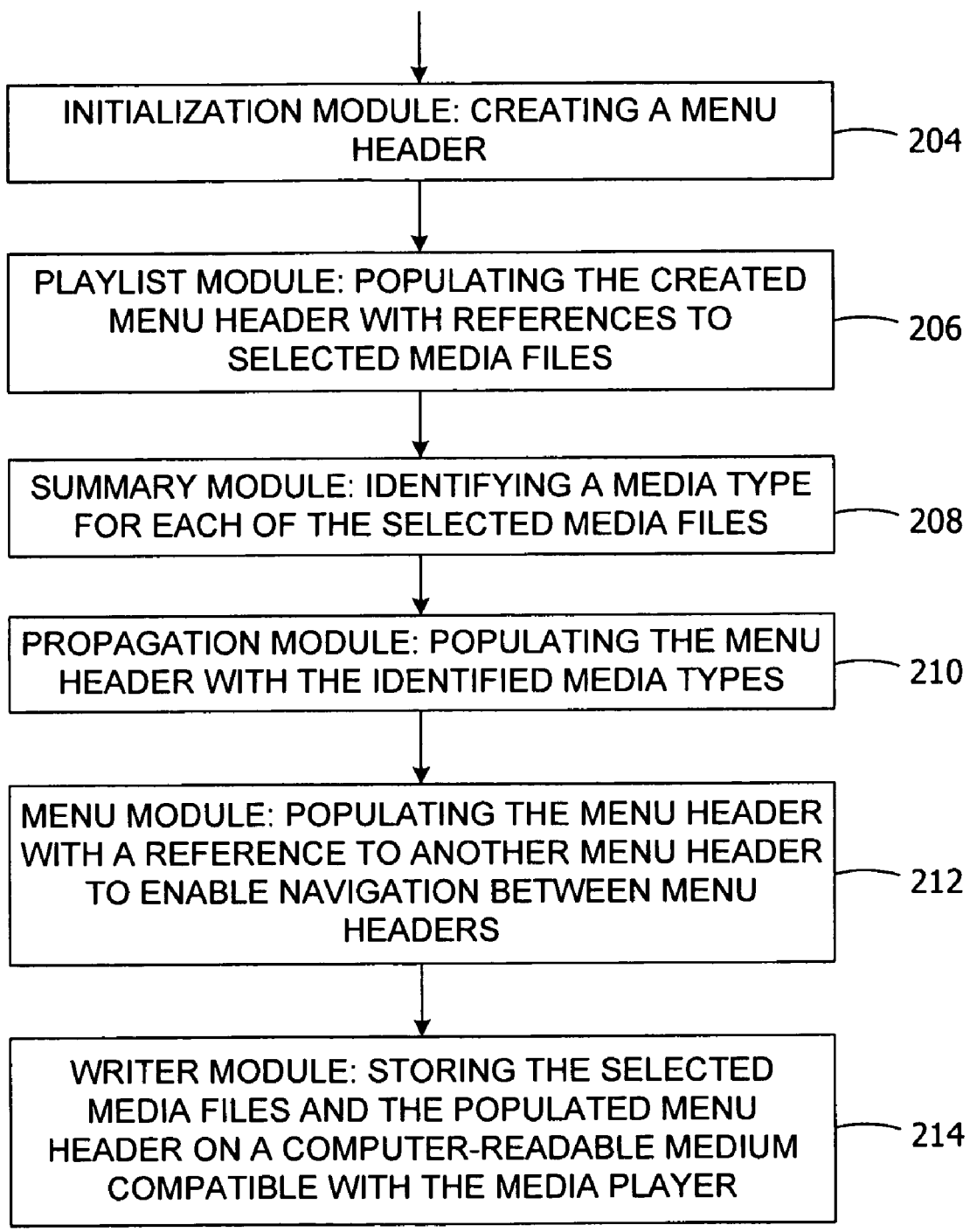
FIG. 2 is a flow chart illustrating exemplary operation of authoring software according to the invention.

Referring next to FIG. 2, a flow chart illustrates exemplary operation of authoring software according to the invention. In the exemplary embodiment of FIG. 2, the authoring software includes computer-executable components for organizing one or more media files to enable the user to navigate the files using the media player. The components include an initialization module, a playlist module, a summary module, a propagation module, a menu module, and a writer module. The initialization module creates a menu header at 204. The playlist module populates the created menu header at 206 with references to selected media files encapsulated as playlists. The summary module identifies the media type associated with each of the selected media files within each of the playlists at 208. The propagation module populates the menu header at 210 with the identified media types. A media player uses the populated menu header to filter the selected media files as a function of a media type associated with the media player. The menu module populates the menu header at 212 with references to other menu header (e.g., at least one) to enable navigation between the menu headers. The writer module stores the selected media files and the populated menu header(s) at 214 on a computer-readable medium compatible with the media player. The references populating the menu header may include, but are not limited to, a memory location offset to the selected media files, a pointer (e.g., a numerical identifier) to a playlist referencing the selected files, or a pointer to the selected media files themselves. In one embodiment, one or more computer-readable media store computer-executable instructions for performing the operations illustrated in FIG. 2. In an alternative embodiment, the menu structure includes a single playlist having a single media file.

Figure 3:
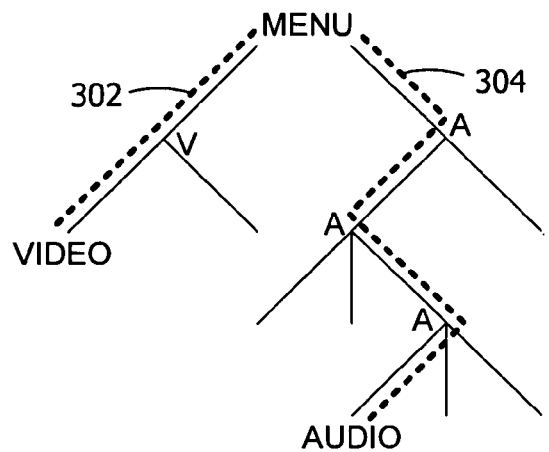
FIG. 3 is an exemplary block diagram of a hierarchical menu structure illustrating the inclusion of media type information in the structure.

After execution of the authoring software, a menu structure exists as illustrated on FIG. 3. Each element in a menu structure according to the invention stores tags or other data indicative of the media type associated with the element. In the example of FIG. 3, the top-level menu has a submenu storing video data and a submenu storing audio data. The submenu storing audio data has additional submenus organizing the audio data. The user may navigate a path 302 in the menu structure to video content, or a path 304 in the menu structure to audio content.

Additional detail regarding creation of menus and playlists follows.

Playlist and Menu Creation

This section describes an exemplary method performed by the authoring software to create playlists from the selected media files and organize the playlists in a hierarchical structure. Operation of the method is based on the type and existing organization of the selected media files. If the selected media files are in a single layer of directories, the authoring software creates a playlist such as 'All media files by directory' in which the media files are grouped by directory name in alphabetical order by file names. If two layers of directories are present and the average top level directory contains less than one and a half subdirectories and more than seventy-five percent of the second level directories contains between five and twenty-five audio files (e.g., a typical artist-album structure with only a few albums for each artist), the authoring software creates a playlist 'All media files by directory' in which the media files are grouped by <directory name 1+'-' directory name 2> in <directory name 1> then <directory name 2> in alphabetical order.

If more than two layers of directories are present or the two layers are too 'leafy' (e.g., contain too many subdirectories per directory) to readily flatten the hierarchy, then the authoring software creates a playlist 'All media files by directory' in which the media files are grouped by <lowest directory name> in the order the directories are found in the file system as the file system is traversed breadth first (not in alphabetical order). If there are any non-null playlist files present, the authoring software creates a playlist for each playlist present. Such playlists are stored under a 'Playlists' menu if there are more than five such playlists. If there are between two and six playlists present, the authoring software creates all remaining menus under a menu item entitled 'Other'.

Playlists for Audio Media Files

The authoring software creates a hierarchical menu structure for organizing the created playlists. In an exemplary embodiment with audio media files, the authoring software creates groups and corresponding menus according to artist, composer, album, artist and album, genre, year, and directory (e.g., corresponding to the existing structure of the selected media files).

At the root of the hierarchical menu structure, a menu entitled 'Artists' has a submenu entitled 'All songs by artist' in which the media files are grouped by artist in alphabetical order. The authoring software creates a submenu for each artist in which the media files associated with the artist are grouped by album in alphabetical order or according to a release date for the album. If composer information is available for some of the selected media files (e.g., greater than twenty-five percent), the authoring software creates a menu 'Composer' at the root with a submenu entitled 'All songs by composer' in which the media files are grouped by composer in alphabetical order. The authoring software creates a submenu for each composer in which the media files associated with the composer are grouped by album in alphabetical order or according to a release date for the album. Media files without composer information are omitted.

The authoring software also creates a menu 'Albums' at the root with a submenu entitled 'All songs by album' in which the media files are grouped by album in alphabetical order or according to a release date for the album. The authoring software further creates a menu 'Artist-Album' at the root in which the media files are grouped according to artist-album pair (i.e., a single group is created for each artist-album pairing). The authoring software also creates a menu 'Genres' with a submenu 'All songs by genre' in which the media files are grouped by genre in alphabetical order (i.e., a single group is created for each genre). A menu 'Year' includes, but is not limited to, the submenus 'All songs by decade,' 'All songs by year,' and 'Directories.' The submenu 'All songs by decade' includes media files grouped by decade in ascending order (e.g., one group for each decade) with 'No year' songs grouped at the end of the groups or omitted. The submenu 'All songs by year' includes media files grouped by year in ascending order (e.g., one group for each year) with 'No year' songs grouped at the end of the groups or omitted. The submenu 'Directories' has groups that parallel an existing directory structure of the selected media files. That is, the submenu 'Directories' has one group for each directory (e.g. "Party Favorites", "Driving music").

Those skilled in the art will appreciate that the playlists and hierarchical structures described herein are merely exemplary. It is contemplated by the inventors that the invention includes other playlists, hierarchical structures, and the like, including any combination of audio data, video data, or still image data.

Playlists for Image Media Files

If the selected media files include still images, the authoring software creates a menu 'All pictures' at the root including every selected image for display (e.g., with a default duration of five seconds). In one embodiment, the duration can be changed via an advanced options dialog in a user interface associated with the authoring software. In addition, the authoring software examines the co-incidence of the selected images and selected music files in existing directories. If all of the directories that have images (e.g., larger than 200×200 pixels) also have music, the authoring software creates a playlist entitled "All pictures with all songs (endless)" arranged by directory so that each directory plays with the accompanying music. In one embodiment, the display time for each image equals the sum of the song lengths in the directory divided by the number of images. For example, each image may be displayed for a minimum of five seconds and a maximum of thirty seconds. The maximum and minimum settings are user adjustable in an advanced options dialog. Some images may not be displayed using this technique if the music in a directory is too short for all the images that are in the directory.

Alternatively, the playlists "All pictures with all songs (endless)" includes all songs playing in parallel with all the images. In one embodiment, the display time for each image equals the sum of the lengths of all the songs in the selected media files divided by the number of images. For example, each image is displayed for a minimum of five seconds and a maximum of thirty seconds. The maximum and minimum settings are user adjustable in an advanced options dialog. The image sequence is repeated as necessary to match the length of music or the music is repeated in the playlist to ensure there is enough music to match the total image length. Images are grouped, for example, by lowest directory name.

Playlists for Video Media Files

If the selected media files include video, the authoring software creates a menu 'Video' at the root of the hierarchical structure. The menu includes a playlist for each video file as well as a playlist for all video files entitled 'Play all videos' with video files concatenated in alphanumeric sequence. The authoring software also groups the video media files according to user input, as described in the following section.

Manual Adjustments to Automatic Playlists

The user may choose to adjust the hierarchical structure and/or default playlists. The user interface associated with the authoring software displays a diagram of the hierarchical structure and playlists with all options pre-checked for inclusion on the computer-readable medium. For example, the menu/playlist structure is displayed as a scrolling tree-view with checkboxes next to each menu or playlist item. Clearing a check box eliminates that entire branch of the tree (although the state of the items below it is preserved in case the user reinstates it).

The user interface associated with the authoring software may implement or disable various features. For example, promote and demote buttons may not be selectable (e.g., grayed-out) if the currently selected item cannot be promoted or demoted. No choice is given to the user where to demote an item, it automatically goes under the correct heading, adding that heading if necessary. For example, if there are three video files in the top-level menu and no 'Video' menu entry, the first demotion will create a heading 'Other video', the second demotion will add to that, the third demotion will rename the heading to 'Video.' No option is given to change the order of the menus or playlists or to change their names. All names are derived from metadata in files or are automatically generated names like 'Other video.' When an individual playlist is promoted to the same level as its containing category the containing category changes name to 'Other . . . ' (e.g. 'Other video').

Other options for the user interface associated with the authoring software include, but are not limited to, adjusting a 'Minimum image duration,' a 'Default image duration,' a 'Maximum image duration,' and a 'Repeat forever (kiosk mode).' The 'Minimum image duration' option allows the user to change the minimum duration for images. The minimum duration is used with the maximum when creating parallel image and audio playlists. The 'Default image duration' option allows the user to change the default duration for images. The default duration is used for images playing as part of an image sequence. The 'Maximum image duration' option allows the user to change the maximum duration for images. This option is used when images and audio are presented together. The 'Repeat forever (kiosk mode)' option causes the repeat count field for each playlist to be set to zero. If this option is not checked, the repeat count is set to '1' for each playlist. In one embodiment, the user may be given options to merge playlists or perform more advanced editing of the menu names and menu structures created automatically. Users can also create playlist files prior to executing the authoring software. Those skilled in the art will note that the authoring software may include more or less functionality than described herein and still be within the scope of the invention.

Figure 4:
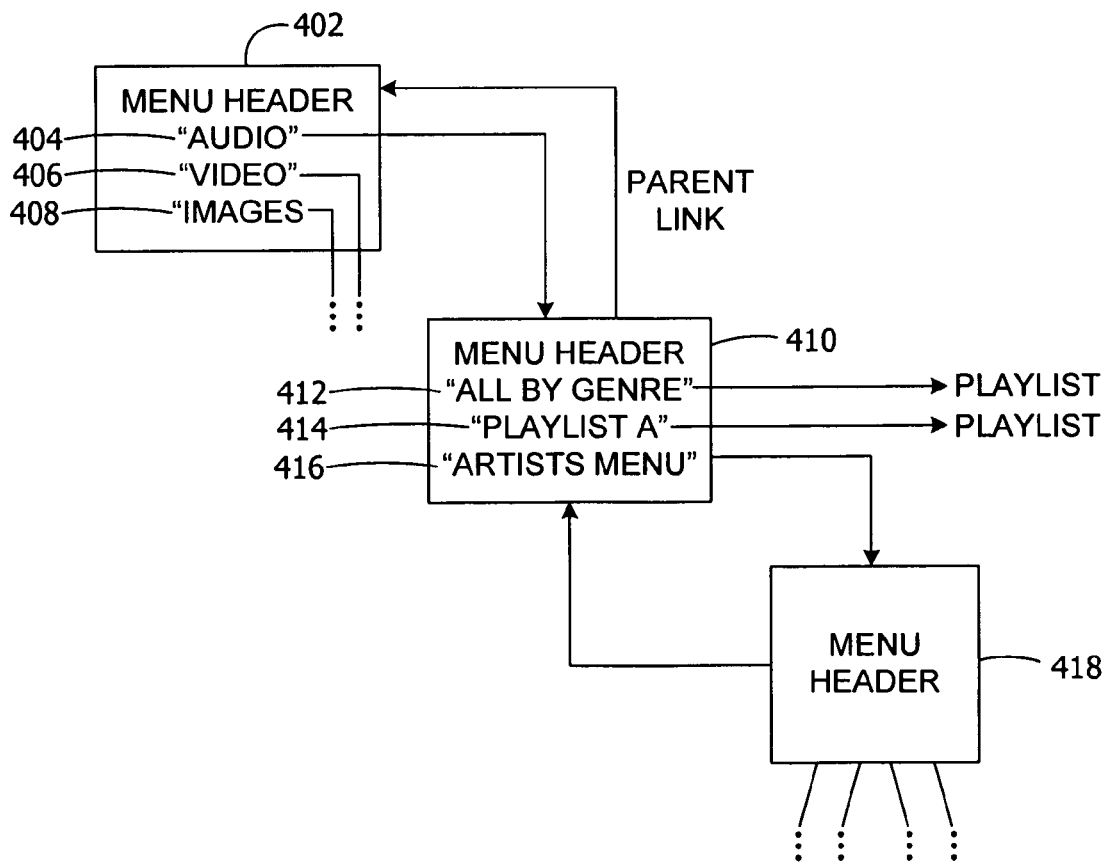
FIG. 4 is an exemplary block diagram illustrating a specific example of a hierarchical menu structure.

After any manual adjustments have been made to the hierarchical structure and/or the default playlists, a menu structure exists such as illustrated in the exemplary menu structure of FIG. 4. In FIG. 4, a menu header 402 includes menu items entitled Audio 404, Video 406, and Images 408. The Audio menu item 404 references a menu header 410 including an All by Genre playlist item 412, a Playlist A playlist item 414, and an Artists Menu menu item 416. The Artists Menu menu item 416 references another menu header 418 that stores further menu items or playlist items. Each menu header includes a reference to a parent menu header. For example, menu header 418 has a reference to menu header 410. Similarly, menu header 410 has a reference to menu header 402. Menu header 402, being at the root of this exemplary menu structure, does not have a parent menu header.

In one embodiment, the authoring software includes a menu simplifier that traverses the created menu structure searching for menus that have only one child. The menu simplifier removes any such menus and promotes the only child in the hierarchy to take the place of the removed menu. In this fashion, the menu simplifier reduces the complexity of the menu structure to simplify navigation by the user.

The authoring software writes a setup file (e.g., in extensible markup language) to the computer-readable medium recording both the default settings and any manual settings of the user. If the user later adds more media files to the same medium (e.g., a re-writeable medium), the authoring software examines the setup file to identify and apply those same settings. For example, if the user deletes all of the default playlists and selects only an 'All songs by lowest directory name' option, then such option will be the default for that computer-readable medium each time the user attempts to add media files to the medium. The authoring software identifies such customized options for the specific medium to the user.

Filtering Software

Figure 5:
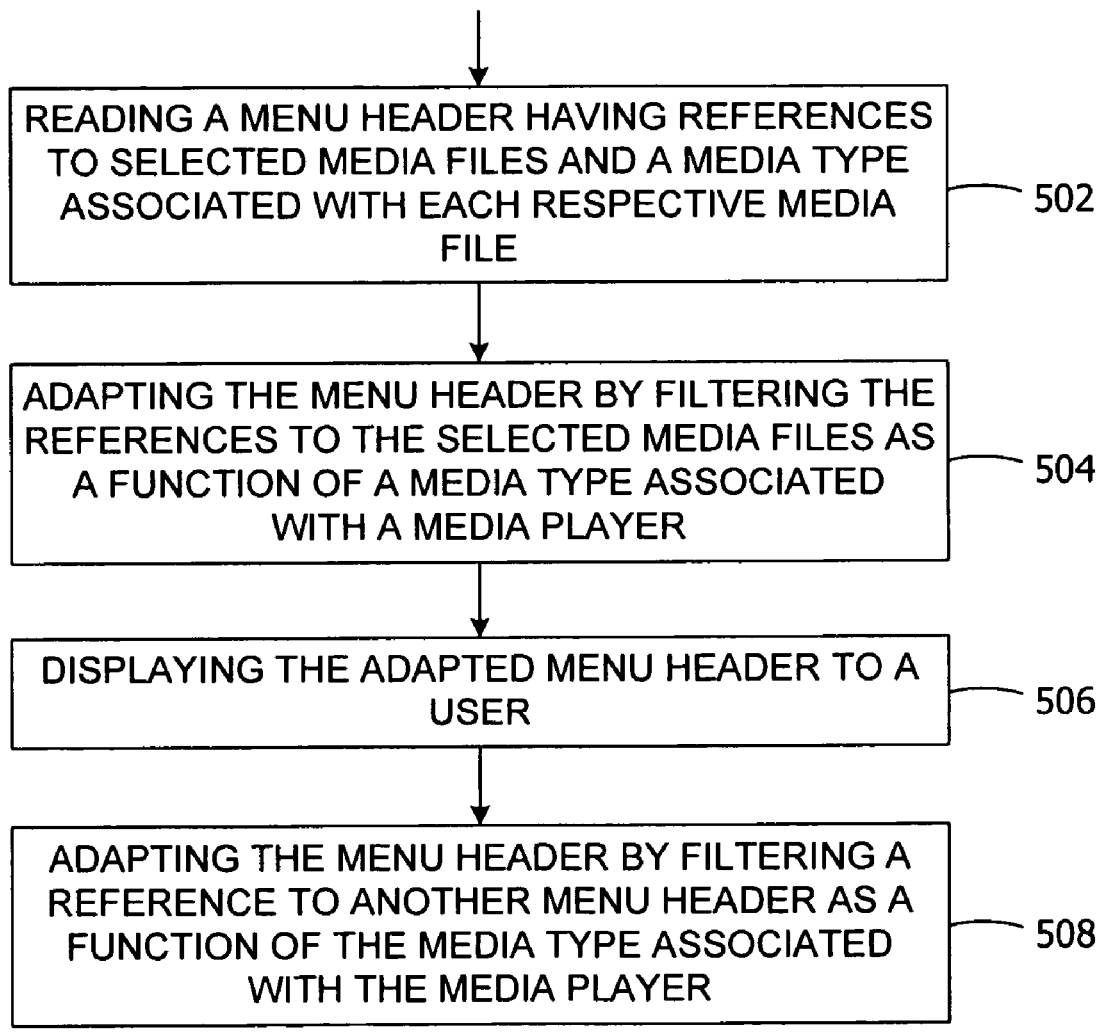
FIG. 5 is a flow chart illustrating exemplary operation of filtering software according to the invention.

Referring next to FIG. 5, a flow chart illustrates exemplary operation of filtering software according to the invention. The filtering software displays menu information (e.g., metadata) on a display associated with the media player. The menu information enables a user to navigate one or more media files using the media player. Each of the media files has a media type and is adaptable for rendering by the media player as a function of the media type. The media player also has a media type. The filtering software reads a menu header at 502 having references to selected media files and a media type associated with each respective one of the selected media files. The filtering software adapts the read menu header at 504 by filtering the references to the selected media files as a function of a media type associated with a media player. In one embodiment, the filtering software shades the non-selectable menu items (e.g., turns to gray) in the user interface to differentiate these menu items from selectable menu items. The filtering software displays menu information at 506 from the adapted menu header to a user on a display associated with the media player. In one embodiment, the menu header includes a reference to another menu header and a media type associated with the other menu header to enable navigation between the menu headers. The filtering software also adapts the read menu header at 508 by filtering the reference to the other menu header as a function of the media type associated with the media player. The media type associated with each respective one of the selected media files and the media type associated with the media player comprise audio, video, and/or image. The references to the selected media files and the references to another menu header include, but are not limited to, a memory location offset to the selected media files a pointer to a playlist referencing the selected media files, or a pointer to the selected media files. In one embodiment, one or more computer-readable media have computer-executable instructions for performing the method illustrated in FIG. 5.

Menu Display

The menu on a medium created by the invention software includes a single hierarchical structure of submenus and playlists. The menu tree may be arbitrarily deep and arbitrarily broad within an overall limit of 9,999 total nodes, for example. Other embodiments may implement other or different restrictions relating to the menu tree. Because each menu may contain up to 9,999 entries, media players display a scrolling or paged view of the menu. TV-connected players may display a thumbnail menu or a simple list menu (e.g., based on whether entries such as playlists or menus within the current menu have thumbnails or not). In one embodiment, TV-connected players display a thumbnail menu only when a thumbnail is present (i.e. non-zero entry) for every entry in the current menu.

The layout of thumbnails on the screen and the number of thumbnails displayed per page is player dependent. Some players may choose to display a continuous scrolling list, others may chose to paginate the menu and offer next/previous selections. On a 4:3 TV set, players will typically display a grid of 3×2 thumbnails while on a 16:9 TV set they may chose to display a 4×2 grid instead.

Players also display the playlist or menu name with the associated thumbnail. In the event that the player cannot display all thumbnails instantaneously, text labels are displayed first and the thumbnails added one by one as they are decoded. The player may allow scrolling to the next or previous page even while the thumbnails are being added in order to allow users to navigate quickly to a given item.

Menu Navigation

Menu display is player dependent; that is, each manufacturer may decide how to display menus. On a portable CD player, for example, the menu might be displayed one line at a time with the Next, Previous, Play/Select and Stop buttons used to navigate through the choices. Most players will display the top-level menu when a medium is inserted. Car receivers, however, may choose to bypass the menu on startup and begin playback immediately with the first playlist on the disk or may resume playback on the song and playlist that was playing the last time they were used. The user would then need to press a 'menu' key to bring up the menu and use Next, Previous and Play/Select to navigate.

On a DVD player, a full graphical display might be shown complete with background image and optional thumbnails. Some DVD players may chose to number the menu items and use the 1-9 keys on a remote control, while some may simply present the menu items in a list or a grid format and use cursor keys for navigation and selection.

Figure 6:
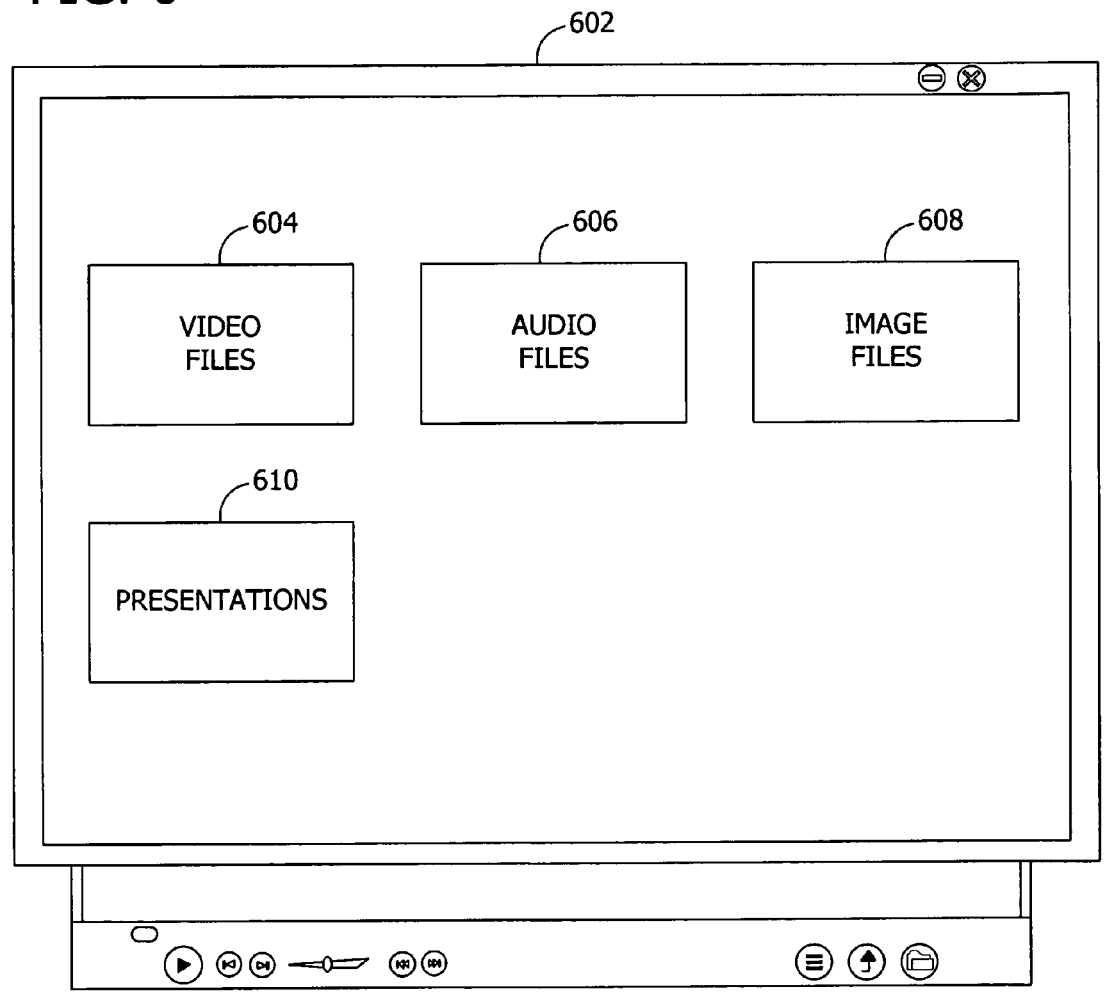
FIG. 6 is a screen shot of an exemplary user interface of filtering software of the invention illustrating the media types available for rendering.

FIG. 6 illustrates a screen shot of an exemplary user interface 602 of the filtering software of the invention illustrating the media types available for navigation. In the example user interface 602 of FIG. 6, icons available for selection by the user include a video files icon 604, an audio files icon 606, an image files icon 608, and a presentations icon 610.

Data Structure for Menus

Figure 7:
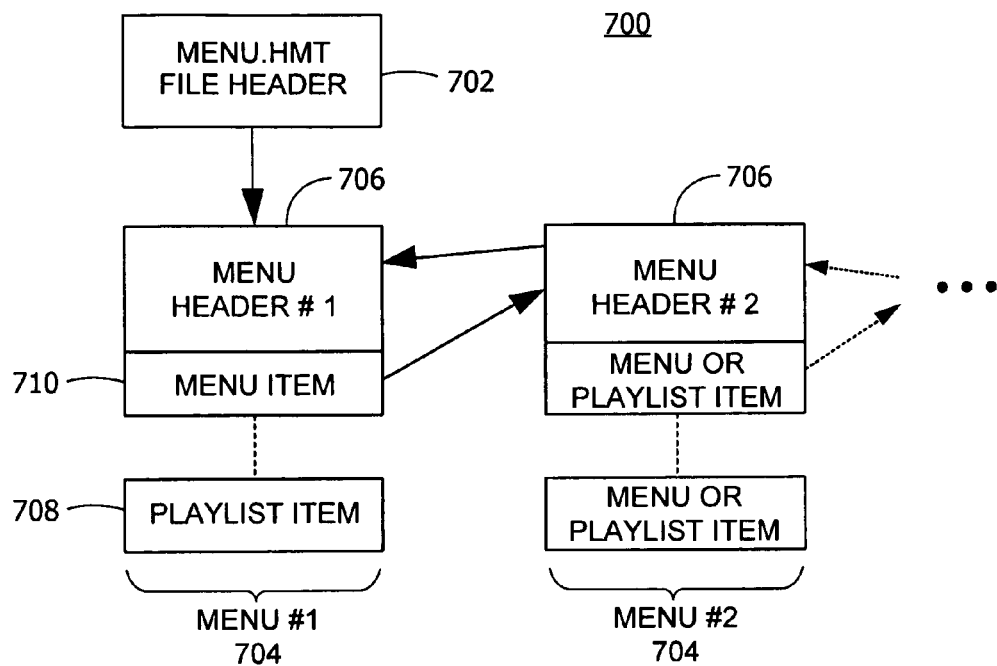
FIG. 7 is an exemplary block diagram illustrating a menu structure having one or more menu headers.

Referring next to FIG. 7, an exemplary block diagram illustrates a menu structure 700 having a file header 702 and one or more menus 704 such as menu #1 and menu #2. Each menu 704 includes a menu header 706 such as menu header #1 and menu header #2. A computer-readable medium stores the menu header 706 representing an organization of one or more media files. The media files each have a media type and are adaptable for rendering by the media player as a function of the media type. The media player also has at least one media type that the media player is capable of rendering. The menu headers 706 shown in FIG. 7 enables a user to navigate the media files using the media player. The menu header 706 comprises a playlist field (e.g., a playlist item 708) and a summary field (e.g., a playlist summary type). The playlist field stores a reference to one or more selected media files.

The reference includes, but is not limited to, a memory location offset to the selected media files, a pointer to a playlist referencing the selected media files, or a pointer to the selected media files. Each of the selected media files has an associated media type. The summary field stores the media type for the selected media file referenced in the playlist field. A media player uses the menu header 706 to filter the selected media files as a function of a media type associated with the media player.

In one embodiment, the menu header 706 illustrated in FIG. 7 includes a menu field (e.g., a menu item 710) storing a reference to another data structure (e.g., another menu header 706 such as menu #2) to enable navigation between the data structures (e.g., between menu header #1 and menu header #2). Further, the menu header 706 may include a metadata field (e.g., menu name, playlist name in menu) storing a value corresponding to metadata selected from one or more of the following as a function of the authoring software: title, composer, performer, genre, and description of content of the selected media files.

A file (e.g., MENU.HMT) containing one or more of the data structures illustrated in FIG. 7 is written to the computer-readable medium storing the selected media files. The file is written such that there are no gaps between the data structures in the file. A description of exemplary data structures for use by the authoring software and the filtering software follows. Fields in exemplary menu file header 702 are shown in Table 1.

TABLE 1

Menu File Header

| Offset | Length | Field Name |
|---|---|---|
| 0 | 8 | Identifier |
| 8 | 2 | Version |
| 10 | 4 | Size of MENU.HMT |
| 14 | 4 | LCID |
| 18 | 2 | Offset of first menu |
| 20 | 2 | Menu Title Length |
| 22 | Variable | Menu Title |

The Identifier field is an eight byte entry containing "MENU_HMT" in ASCII. The Version field is a two byte entry representing the version of the specification used to author this file. For example, version 1.20 would be stored as 0x78 (120 decimal). The Size of MENU.HMT field is a four byte entry containing the size of MENU.HMT in bytes. The LCID field is a four byte entry for the Language ID of this MENU.HMT file. The Offset of First Menu field is a two byte entry representing the byte offset from the beginning of the MENU.HMT to the first Menu Header 706. The Menu Title Length field is a two byte entry containing the byte length of the menu title excluding the ending null UCS-2 character (two null bytes). The Menu Title field stores a menu title terminated with a null UCS-2 character (two null bytes). The maximum length for this entry is 65 UCS-2 characters including the null UCS-2 character. Players use this to display a title for the entire menu. An empty string (one NULL character) indicates that there is no title to display or that the authoring software has rendered the title onto the background image. For example: "My Hawaii Vacation", "2002 School Party".

Menus 704 support either a background image, solid background color or player default behavior. If a background image or background color is defined, then the text color is also defined. If the background image, background color and text color entries are zero, then the player uses its default behavior. Each submenu is referenced by a single parent menu forming a strict hierarchical menu structure. The fields in exemplary menu header 706 are shown in Table 2.

TABLE 2

Menu Header

| Offset | Length | Field Name |
|---|---|---|
|  | 4 | Size of Menu Header |
|  | 4 | Offset to Parent Menu |
|  | 4 | Background Image ID (4:3) |
|  | 4 | Background Image ID (16:9) |
|  | 4 | Background Color |
|  | 4 | Text Color |
|  | 2 | Number of Items |
|  | 2 | Menu Subtitle Length |
|  | Variable | Menu Subtitle |
|  | Variable | Menu or Playlist Item #1 |
|  |  | . . . |
|  | Variable | Menu or Playlist Item #n |

*n represents the number of menu items

The Size of Menu Header field is a four byte entry representing the size of the Menu Header 706 including the Menu Item 710 and Playlist Item 708 in bytes. The Offset to Parent Menu field is a four byte entry representing the byte offset from the beginning of MENU.HMT to the Parent Menu. This value is zero if this is the top level menu 704. The Background Image ID (4:3) field is a four byte entry defining the image to display as the background of this menu 704 on a 4:3 display. The image should be a 640×480 JPG file with an HMT extension. A value of zero indicates there is no background image. The value is the index of a Menu Image file in CONTENTS.HMT (see FIG. 9). Players should display the background image centered on the display preserving the aspect ratio. Players should use a background color if any to fill in any uncovered area. The Background Image ID (16:9) field is a four byte entry defining the image to display as the background of this menu on a 16:9 display. The image should be a 852×480 JPG file with an HMT extension. A value of zero indicates there is no background image. If this value is non zero then there should be a valid Background Image ID (4:3) as well. The value is the index of the Menu Image file in CONTENTS.HMT. Players should display the background image centered on the display preserving the aspect ratio.

The Background Color field is a four byte entry defining the background color that should be used when this menu is rendered on the display. It is formatted as an RGB value with the following byte order: 0xFFRRGGBB. If a Background Image ID is defined then the background color should only be visible on areas of the display not covered by the background image if any. A value of zero indicates there is no background color. If a player is not capable of color rendering then this field may be ignored. The Text Color field is a four byte entry defining the color that the text on this menu 704 should be rendered on the display. It is formatted as an RGB value with the following byte order: 0xFFRRGGBB. If a Background Image ID or Background Color is defined then this entry should contain a non zero value. A value of zero is defined to mean that the player should use its default behavior. If a player is not capable of color rendering then this field may be ignored. The Number of Items field is a two byte entry defining the number of menu items 710 or Playlist Items 708 in this menu 704. The Menu Subtitle Length field is a two byte entry containing the byte length of the menu subtitle including the ending null UCS-2 character (two null bytes). The Menu Subtitle field is a menu subtitle terminated with a null UCS-2 character (two null bytes). The maximum length for this entry is 65 UCS-2 characters including the null UCS-2 character.

Players should use this to display a subtitle for this menu 704. An empty string (one NULL character) indicates that there is no subtitle to display or that the authoring software has rendered the title onto the background image. The Menu or Playlist Item field is a variable-sized entry representing either a Menu item 710 or a Playlist Item 708.

Fields in exemplary menu item 710 are shown in Table 3.

TABLE 3

Menu Item

| Offset | Length | Field Name |
| --- | --- | --- |
| 0 | 1 | Type of entry |
| 1 | 1 | Menu Summary Type |
| 2 | 4 | Thumbnail ID (0 if no thumbnail) |
| 6 | 4 | Selected State Thumbnail ID |
| 10 | 4 | Offset to Menu |
| 14 | 2 | Menu Name Length |
| 16 | Variable | Menu Name |

The Type of Entry field is a one byte entry defining whether this is a menu item 710 or a playlist item 708 data structure. For the menu item 710, this value should be the value of MENU as defined in Table 4.

TABLE 4

Type of Entry

| Type of Entry | Value |
| --- | --- |
| 0 | UNUSED |
| 1 | MENU |
| 2 | PLAYLIST |
| 3-255 | RESERVED |

The Menu Summary Type field is used to define the type of playlists that are accessible via this menu item. The Thumbnail ID field is a four byte entry representing the Thumbnail ID for this menu item 710 in CONTENTS.HMT; if there is no thumbnail for this menu item 710 then the value is zero. The Selected State Thumbnail ID field is a four byte entry defining the Thumbnail ID that represents the selected state for this menu item 710 in CONTENTS.HMT. A value of zero indicates that the player should generate a bounding rectangle or other highlight to indicate selection using a color. The Offset to Menu field is a four byte entry defining the byte offset from the beginning of MENU.HMT to the Menu 704. The Menu Name Length field is a two byte entry containing the byte length of the menu name excluding the ending null UCS-2 character (two null bytes). The Menu Name field is the name of the Menu 704 terminated with a null UCS-2 character (two null bytes). The maximum length for this entry is 65 UCS-2 characters including the null UCS-2 character.

Fields in exemplary playlist item 708 are shown in Table 5.

TABLE 5

Playlist Item

| Offset | Length | Field Name |
| --- | --- | --- |
| 0 | 1 | Type of entry |
| 1 | 1 | Playlist Summary Type |
| 2 | 4 | Thumbnail ID (0 if no thumbnail) |
| 6 | 4 | Selected State Thumbnail ID |
| 10 | 4 | Playlist ID |
| 14 | 4 | Starting Group Index |
| 18 | 4 | Starting File Index |

TABLE 5-continued

Playlist Item

| Offset | Length | Field Name |
| --- | --- | --- |
| 22 | 2 | Playlist Name in Menu Length |
| 24 | Variable | Playlist Name in Menu |

The Type of Entry field is a one byte entry defining whether this is a menu item 710 or playlist item 708. For the playlist item 708 this value should be the value of PLAYLIST. The Playlist Summary Type field is used to define the type of playlist that this menu item 710 references. The Thumbnail ID field is a four byte entry defining the Thumbnail ID for this menu item 710 in CONTENTS.HMT. If there is no thumbnail for this menu item then the value is 0. The thumbnail ID may be the same as the thumbnail ID in a playlist header. The Selected State Thumbnail ID field is a four byte entry defining the Thumbnail ID that represents the selected state for this menu item 710 in CONTENTS.HMT. A value of zero indicates that the player should generate a bounding rectangle or other highlight to indicate selection using a color. The Playlist ID field is a four byte entry defining the ID of the playlist for this menu item 710 in CONTENTS.HMT. The Starting Group Index field is a four byte entry defining the index of the Group in the playlist file to start playback. A value of one indicates the first group in the playlist. The Starting File Index field is a four byte entry defining the index of the File in the group to start playback. A value of one indicates the first file in the group. In addition, this value is one if the Group is a Parallel playlist group (PIA).

The Starting Group Index and Starting File Index together allow one playlist to be referenced multiple times in the menu 704. For example, a menu 704 could show thumbnails for every image on the disk and each thumbnail would take you to a looping playlist of all images beginning with the selected image. Playlist Name in Menu Length field is a two byte entry containing the byte length of the playlist name in menu 704 excluding the ending null UCS-2 character (two null bytes). Playlist Name in Menu field is the name of the Playlist as it appears in the Menu 704. The name is terminated with a null UCS-2 character (two null bytes). The maximum length for this entry is 65 UCS-2 characters including the null UCS-2 character.

The Menu Image File Table is used to list all of the thumbnails and background images used in the MENU.HMT file (see Appendix A). The Menu Image File Table include a list of Menu Image File Entries followed by a file name table (see Table 7). One Menu Image File Entry exists for each Menu Image File. Each Menu Image file entry is formatted as shown in Table 6.

TABLE 6

Menu Image File Entry Format

| Offset | Length | Field Name |
| --- | --- | --- |
| 0 | 4 | Offset to Directory Number |
| 4 | 2 | File Type |
| 6 | 2 | Special Flags |

TABLE 7

File name table

| Offset | Length | Field Name |
|---|---|---|
|  | 4 | Directory Number CID#n+1 |
|  | 2 | File Name Length CID#n+1 |
|  | variable | File Name CID#n+1 |
|  | ... |  |
|  | 4 | Directory Number CID#m |
|  | 2 | File Name Length CID#m |
|  | variable | File Name CID#m |

* m-n represents the number of Menu Image files

The Offset to Directory Number field is a four byte entry representing the byte offset from the beginning of CONTENTS.HMT to the directory number for this entry. The File Type field is a two byte entry representing the File type (e.g., the data encoding format). Valid values include thumbnail, menu background (4×3), and menu background (16×9). The Special Flags field is a two byte entry holding special flags. The Directory Number field is a four byte entry representing the index in the directory table of the directory that contains this file. The File Name Length field is a two byte entry containing the byte length of the file name excluding the ending null UCS-2 character (two null bytes). The File Name field is the file name terminated with a null UCS-2 character (two null bytes). The maximum length for this entry is 111 UCS-2 characters including the null UCS-2 character. This entry uses Big-Endian word layout.

Support for Multiple Languages

Figure 8:
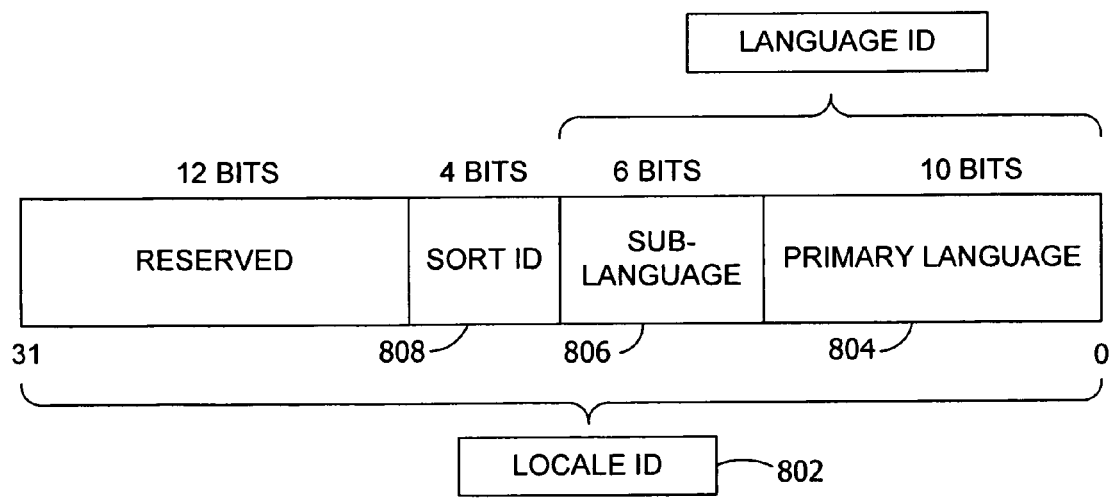
FIG. 8 is an exemplary block diagram illustrating a structure storing locale information.

The data structure (e.g., menu header) 706 illustrated in FIG. 7 includes a locale field storing a value identifying metadata associated with the selected media files. The metadata corresponds to a specific language. The locale field provides support for multiple languages of menu and text data on a single storage medium. The structure of an exemplary locale identifier (LCID) 802 is illustrated in FIG. 8. In an exemplary compressed media format as described in Appendix A, the file headers of TEXT.HMT and MENU.HMT contain the LCID 802 that represents their language and they must match. CONTENTS.HMT contains a list of LCID's for the languages on this storage media.

The media players use the first item in the list of LCIDs 802 as the default language. If there is more than one language defined then the player should choose the LCID 802 to play from the list (e.g., based on the language or locale of the media player). The player loads the corresponding TEXT.HMT and MENU.HMT by using a Directory Number for those files. The first (default) LCID 802 entry should have the Directory Number that is the location of CONTENTS.HMT; i.e. the default language MENU.HMT and TEXT.HMT is in the same directory as CONTENTS.HMT.

The LCID 802 itself has several parts: the first ten bits are the primary language ID 804, which contains the language itself. The next six bits contain the sublanguge ID 806, which is often used to differentiate regions that share the same primary language ID 804. The next four bits represent the sort ID 808, which can differentiate between alternate sorting orders that might be used for the same language and region. The remaining 12 bits are reserved for future use and should always be zero.

For example, the LCIDs 802 may be stored in a file such as CONTENTS.HMT HMT file described below.

Structure of CONTENTS.HMT File

Figure 9:
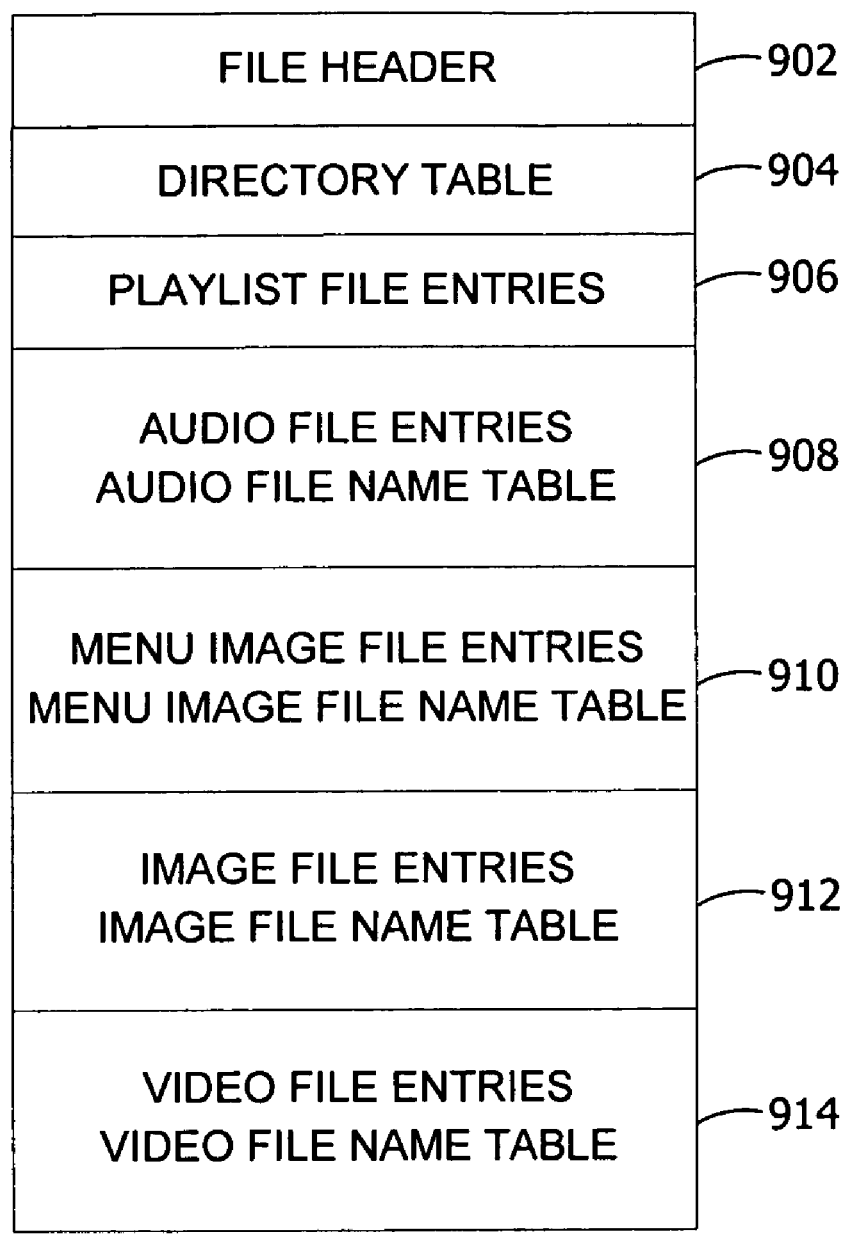
FIG. 9 is an exemplary block diagram of a data structure storing data associated with all the media files on a computer-readable medium.

FIG. 9 illustrates the structure of an exemplary CONTENTS.HMT file. The exemplary CONTENTS.HMT file includes a file header 902, a directory table 904, playlist file entries 906, audio file entries and audio file name table 908, menu image file entries and menu image file name table 910, image file entries and image file name table 912, and video file entries and video file name table 914. The offsets in the accelerator files are byte offsets from the beginning of the file. The Audio 908, Menu Image 910, Image 912 and Video 914 file tables start on a 2K boundary. The directory table 904 is written after the file header 902 including the LCID table with no extra padding. If there are no files available of a given type, the corresponding table is empty. This is authored as both the number of files and the offset of the table being zero. Table 8 illustrates exemplary file header 902.

TABLE 8

File manifest header

| Offset | Length | Field Name |
|---|---|---|
| 0 | 8 | Identifier |
| 8 | 2 | Version |
| 10 | 8 | HMT Generation |
| 18 | 4 | Size of CONTENTS.HMT |
| 22 | 4 | Number of Directories |
| 26 | 4 | Offset to Directory table |
| 30 | 4 | Number of Playlist Files |
| 34 | 2 | Size of playlist Entry |
| 36 | 4 | Offset to Playlist file table |
| 40 | 4 | Number of Audio files |
| 44 | 2 | Size of Audio Entry |
| 46 | 4 | Offset to Audio file table |
| 50 | 4 | Number of Menu Image files |
| 54 | 2 | Size of Menu Image Entry |
| 56 | 4 | Offset to Menu Image file table |
| 60 | 4 | Number of Image files |
| 64 | 2 | Size of Image Entry |
| 66 | 4 | Offset to Image file table |
| 70 | 4 | Number of Video files |
| 74 | 2 | Size of Video Entry |
| 76 | 4 | Offset to Video file table |
| 80 | 2 | Number of LCID entries |
| 82 | 4 | Directory Number 1 |
| 86 | 4 | LCID 1 |
|  | ... |  |
| 82 + 8 * (n − 1) | 4 | Directory Number n |
| 86 + 8 * (n − 1) | 4 | LCID n |

The Identifier field is an eight byte entry containing "INFO_HMT" in ASCII. The Version field is a two byte entry representing the version of the specification used to author this file. For example, version 1.20 would be stored as 0x78 (120 decimal). The HMT Generation field is an eight byte entry representing the generation of LSN.HMT that matches this CONTENTS.HMT. This CONTENTS.HMT is only used with an LSN.HMT file that contains the same HMT Generation number. If the HMT Generation values do not match, the player ignores the LSN.HMT file. A value of zero indicates that there is no LSN.HMT file. The Size of CONTENTS.HMT field is a four byte entry containing the size of CONTENTS.HMT in bytes. The Number of Directories field is a four byte entry containing the number of directories in directory table 904. The Offset to Directory Table field is a four byte entry representing the byte offset from the beginning of CONTENTS.HMT to the directory table 904. The Number of Playlist Files field is a four byte entry containing the number of playlist files in a playlist file table. There is at least one playlist file. The Size of Playlist Entry field is a two byte entry representing the size of a Playlist Entry in bytes. The Offset to Playlist File Table field is a four byte entry representing the byte offset from the beginning of CONTENTS.HMT to the playlist file table. The Number of Audio Files field is a four byte entry containing the number of audio files in audio file table 908. The Size of Audio Entry field is a two byte entry representing the size of an Audio File Entry in bytes. The Offset to Audio File Table field is a four byte entry representing the byte offset from the beginning of CONTENTS.HMT to the audio file table 908. The offset is a multiple of 2K, any gaps between the end of the Playlist File Table and the start of the Audio File Table 908 are ignored. A value of zero indicates that there are no Audio Entries in CONTENTS.HMT.

The Number of Menu Image Files field is a four byte entry containing the number of Menu Image files in a Menu Image file table 910. The Size of Menu Image Entry field is a two byte entry representing the size of a Menu Image File Entry in bytes. The Offset to Menu Image File Table field is a four byte entry representing the byte offset from the beginning of CONTENTS.HMT to the Menu Image file table 910. The offset is a multiple of 2K, any gaps between the end of the Audio File Table 908 and the start of the Menu Image File Table 910 are ignored. A value of zero indicates that there are no Menu Image Entries in CONTENTS.HMT. The Number of Image Files field is a four byte entry containing the number of Image files in an Image file table 912. The Size of Image Entry field is a two byte entry representing the size of an Image File Entry in bytes. The Offset to Image File Table field is a four byte entry representing the byte offset from the beginning of CONTENTS.HMT to the Image file table 912. The offset is a multiple of 2K, any gaps between the end of the Menu Image File Table 910 and the start of the Image File Table 912 are ignored. A value of zero indicates that there are no Image Entries in CONTENTS.HMT. The Number of Video Files field is a four byte entry containing the number of video files in a video file table 914. The Size of Video Entry field is a two byte entry representing the size of a Video File Entry in bytes. The Offset to Video File Table field is a four byte entry representing the byte offset from the beginning of CONTENTS.HMT to the video file table 914. The offset is a multiple of 2K, any gaps between the end of the Image File Table 912 and the start of the Video File Table 914 are ignored. A value of zero indicates that there are no Video Entries in CONTENTS.HMT. The Number of LCID entries field is a two byte entry representing the number of languages on the medium. This value is at least 1. The Directory Number field is a four byte entry representing the index in directory table 904 of the directory that contains the TEXT.HMT and MENU.HMT for this locale identifier. This is a subdirectory of \HIGHMAT with the LCID as the directory name. However, a reference to \HIGHMAT itself is valid for the default language. The LCID n field is a four byte entry representing the locale identifier.

The data structures of the invention are organized such that only the current menu needs to be in memory associated with the media player. The flexible menu system of the invention scales from a minimal device (e.g., portable CD player) to a large, 16:9 television display (e.g., a DVD player menu). The medium specifies menu hierarchy, but the layout, thumbnails (consumer images, video thumbnails, or predefined art like these), and background image vary per media player. In one embodiment, menu or playlist names are user entered or auto-generated. Menus are filtered to display only those menu items that the player is capable of displaying or playing (e.g. an audio-only player will remove all image and video menu entries to display only pure-audio selections).

Exemplary Operating Environment

Figure 10:
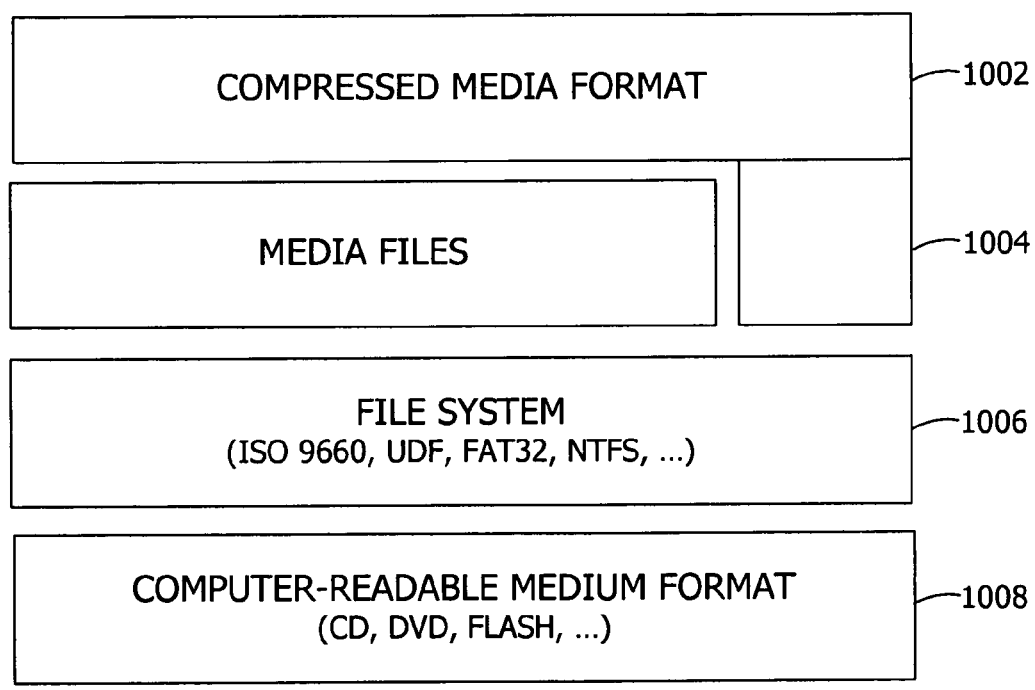
FIG. 10 is a block diagram illustrating an exemplary compressed media format for use with the invention software.

As illustrated in FIG. 10, the invention is operable as part of an exemplary compressed media format 1002 having a set of small files containing metadata, menus, and playlists in a compiled binary format designed for playback on feature-rich PC media players as well as low cost media players. See Appendix A for an example of accelerator files for use as part of an exemplary compressed media format. The exemplary compressed media format of the invention encompasses audio, still images, and video media files 1004 in various formats. The compressed media format for use with the invention defines a logical format for organizing compressed media files 1004 in a file system 1006 on computer-readable media 1008 such as optical discs (e.g., CD-ROM, CD-R, CD-RW, DVD-RAM, DVD-R, DVD-RW, DVD+RW, DVD+R, DVD-ROM), flash memory (e.g., COMPACTFLASH brand, secure digital, MEMORY STICK brand), magnetic media (e.g., hard disks), and the like.

Figure 11:
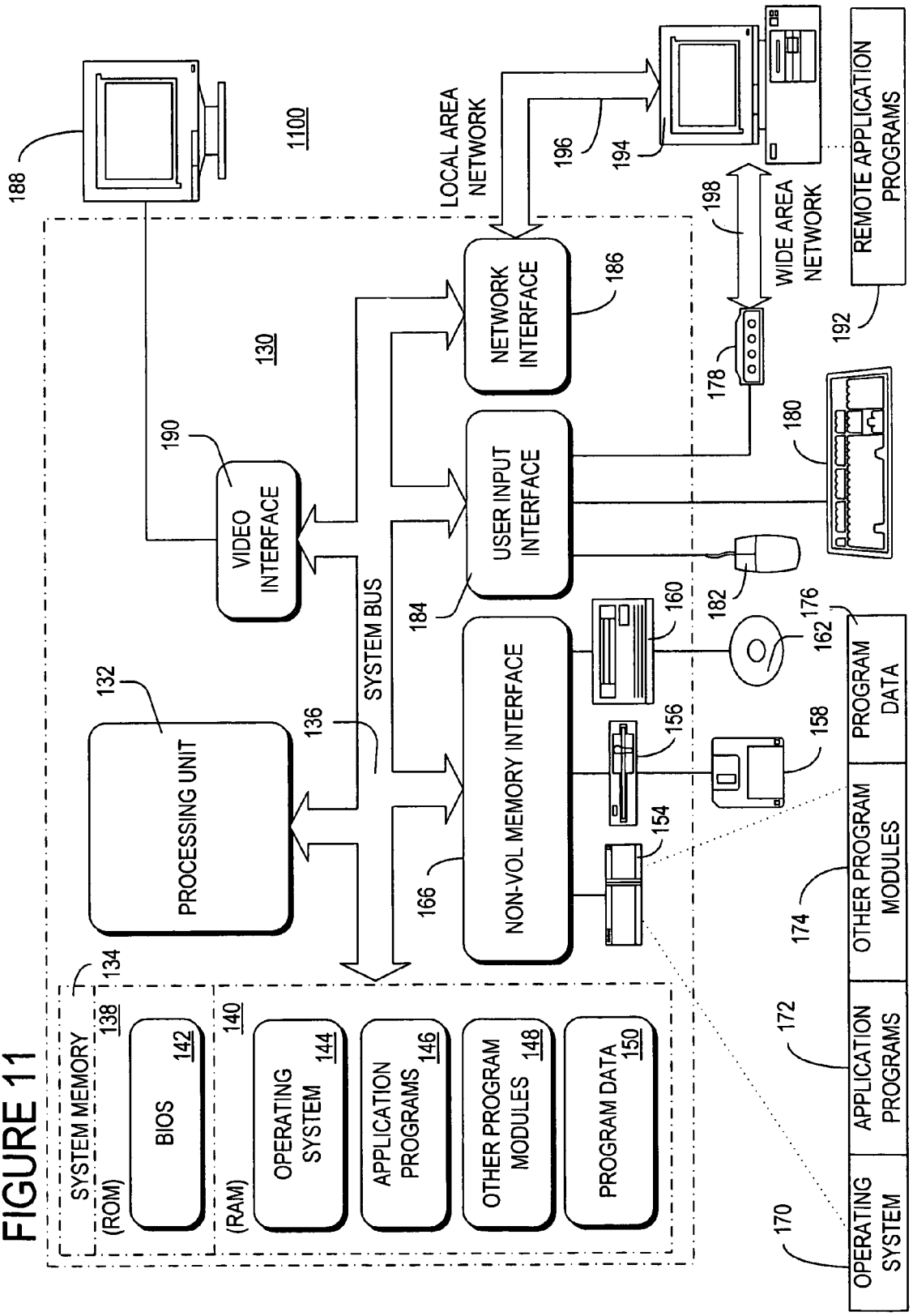
FIG. 11 is a block diagram illustrating one example of a suitable computing system environment in which the invention may be implemented.

FIG. 11 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile discs (DVD) or other optical disc storage, magnetic cassettes, magnetic tape, magnetic disk storage or other magnetic storage devices, or any other medium that can be used to store the desired information and that can accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 11 illustrates operating system 144, application programs 146, other program modules 148, and program data 150.

The computer 130 may also include other removable/non-removable, volatile/nonvolatile computer storage media. For example, FIG. 11 illustrates a hard disk drive 154 that reads from or writes to non-removable, nonvolatile magnetic media. FIG. 11 also shows a magnetic disk drive 156 that reads from or writes to a removable, nonvolatile magnetic disk 158, and an optical disc drive 160 that reads from or writes to a removable, nonvolatile optical disc 162 such as a CD-ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 144, and magnetic disk drive 156 and optical disc drive 160 are typically connected to the system bus 136 by a non-volatile memory interface, such as interface 166.

The drives or other mass storage devices and their associated computer storage media discussed above and illustrated in FIG. 11, provide storage of computer readable instructions, data structures, program modules and other data for the computer 130. In FIG. 11, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 11 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 194, or other appropriate mechanism. In a networked environment, program modules depicted relative to computer 130, or portions thereof, may be stored in a remote memory storage device (not shown). By way of example, and not limitation, FIG. 11 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 2 to organize media files in an adaptive menu structure. In addition, computer 130 in a media player executes computer-executable instructions such as those illustrated in FIG. 5 to filter the menu structure according to the capabilities of the media player.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

Appendix A

FIG. A1 illustrates a file system in an exemplary compressed media format for use with the invention software. The accelerator files exist on a medium under a top-level directory called 'HIGHMAT' and include the following files: CONTENTS.HMT, nnnnnnn.HMT, MENU.HMT, and TEXT.HMT. The CONTENTS.HMT file contains information about all the media files present on the medium. It contains a directory table, followed by the file entry tables for each of the supported file types (Audio, Video, Image and Playlist). There is one file for each playlist on the medium called 'nnnnnnnn.HMT' where nnnnnnnn is a hexadecimal playlist file identifier. These playlist files are created in a 'PLAYLIST' subdirectory. The MENU.HMT file contains the menu structure. The TEXT.HMT file contains all the textual information needed during playback.

In alternative embodiment, the following files are included: <Thumbnail>.HMT and <Background>.HMT. There is one file for each thumbnail on the medium (e.g., 160×120 JPG format with .HMT extension). The authoring software may name the files as appropriate. The Thumbnail files are created in an 'IMAGES' subdirectory. There is one file for each menu background on the medium. Backgrounds with a 4:3 aspect ratio are in 640×480 JPG format with .HMT extension. Backgrounds with a 16:9 aspect ratio are in 852×480 JPG format with .HMT extension. The authoring software may name the files as appropriate. The Background files are created in the 'IMAGES' subdirectory.

The HIGHMAT directory and all of the files within it may be marked as hidden by the software that creates the medium in order to lessen user confusion. Players should handle media whether these files and directories are hidden or not. All of the binary structures should be encoded using Little Endian byte ordering. File and Directory names should use Big Endian byte ordering. When the player encounters an unknown value the default behavior should be to ignore the offending file. For example, if Playlist Summary Type is equal to 255, then the entire playlist should be skipped.

The mapping of metadata to the fields in TEXT.HMT is outlined in the following table.

TABLE A1

|  | Audio Files | Image Files | Video Files | Playlist Files |
| --- | --- | --- | --- | --- |
| Text1 | Audio Title | Image Title | Video Title | Playlist Name |
| Text2 | Artist Name | Creating Device Name (DSC Name) | Artist Name | None |
| Text3 | Composer Name | Date Image Taken | Created Date | None |
| Text4 | Album Name | Album Name | Album Name | None |
| Text5 | Genre Name | Genre Name | Genre Name | Genre Name |
| Group | None | None | None | Group Name |
| Extra Text Lyrics | Lyrics | Note (Comment) | Note (Comment) | None |
| Copyright | Copyright | Copyright | Copyright | None |
| Album Artist | Album Artist | None | None | None |

The structure of TEXT.HMT file is shown in Table A2.

TABLE A2

| File Header |
| --- |
| Contents Text Entry Table |
| Group Text Entry Table |
| Extra Text Entry Table |
| Contents Text Data |
| Group Name Text Data |
| Extra Text Data |

The file should be written such that there are no gaps between the data structures in the file.

TABLE A3

| Text File Information Format | | |
| --- | --- | --- |
| Offset | Length | Field Name |
| 0 | 8 | Identifier |
| 8 | 2 | Version |
| 10 | 4 | File size |
| 14 | 4 | Number of Contents Text Entries |
| 18 | 4 | Number of Group Text Entries |
| 22 | 4 | Number of Extra Text Entries |
| 26 | 4 | Offset of contents text entries |
| 30 | 4 | Offset of group text entries |
| 34 | 4 | Offset of extra text entries |
| 38 | 4 | LCID |
| 42 | 2 | Disk Name Length |
| 44 | Variable | Disk Name |

Identifier

This field should be "TEXT_HMT" by ASCII in 8 bytes.

Version

This 2 byte entry represents the version of the HMT specification used to author this file. For example version 1.20 would be stored as 0x78 (120 decimal)

File Size

This field should contain the size of this TEXT.HMT file in 4 bytes.

Number of Contents Entries

This 4 byte entry defines the number of Contents Text Entries.

Number of Group Entries

This 4 byte entry defines the number of Group Text Entries.

Number of Extra Text Entries

This 4 byte entry defines the number of Extra Text Entries.

Offset of Contents Text Entries

This 4 byte entry is the offset from the beginning of TEXT.HMT to the Contents text entry table.

Offset of Group Text Entries

This 4 byte entry is the offset from the beginning of TEXT.HMT to the Group text entry table.

Offset of Extra Text Entries

This 4 byte entry is the offset from the beginning of TEXT.HMT to the Extra text entry table.

LCID

This 4 byte entry is the Language ID of this MENU.HMT file.

Disk Name Length

This 2 byte entry contains the byte length of the disk name excluding the ending null UCS-2 character (two null bytes).

Disk Name

This variable length entry represents the name of the disk. The Disk Name is UCS-2 and should be terminated with a null UCS-2 character (two null bytes). The maximum length for this entry is 65 UCS-2 characters including the null UCS-2 character.

Text Entry

All of the text items are stored using the following format:

TABLE A4

Text Entry

| Offset | Length | Field Name |
|--------|--------|------------|
| 0 | 2 | Length |
| 2 | Variable | Text |

Length

This 2 byte entry contains the byte length of the text excluding the ending null UCS-2 character (two null bytes).

Text

This is the UCS-2 Text Entry. The text should be terminated with a null UCS-2 character (two null bytes). The maximum length for text entries is shown in the following table.

TABLE A5

Text Length

| Type of Text Data | Maximum Length |
|-------------------|----------------|
| Group Name | 65 |
| Extra Text Entries | 32,767 |
| All Other | 1,024 |

The length is defined as UCS-2 characters and includes the ending Null UCS-2 character.

The Contents text entry Table includes a list of Contents Text Entries (see Table A6). There is one Contents Text Entry for each file in CONTENTS.HMT (Playlist, Audio, Menu Image, Image and Video) in the same order as the files are listed in CONTENTS.HMT.

TABLE A6

Contents Text Entry

| Offset | Length | Field Name |
|--------|--------|------------|
| 0 | 4 | Contents ID |
| 4 | 4 | Offset of Text1 entry |
| 8 | 4 | Offset of Text2 entry |
| 12 | 4 | Offset of Text3 entry |
| 16 | 4 | Offset of Text4 entry |
| 20 | 4 | Offset of Text5 entry |
| 24 | 4 | Offset of extra text entry |

Contents ID

This 4 bytes entry represents of Contents ID for this Contents text entry.

Offset of Text1 Entry

This 4 bytes entry represents the offset from the beginning of TEXT.HMT for first byte of Text1 entry. It is required that each contents item in CONTENTS.HMT has a Text1 entry.

Offset of Text2 Entry

This 4 bytes entry represents the offset from the beginning of TEXT.HMT for first byte of Text2 entry. If the contents item does not have Text2 data then this entry should be 0.

Offset of Text3 Entry

This 4 bytes entry represents the offset from the beginning of TEXT.HMT for first byte of Text3 entry. If the contents item does not have Text3 data then this entry should be 0.

Offset of Text4 Entry

This 4 bytes entry represents the offset from the beginning of TEXT.HMT for first byte of Text4 entry. If the contents item does not have Text4 data then this entry should be 0.

Offset of Text5 Entry

This 4 bytes entry represents the offset from the beginning of TEXT.HMT for first byte of Text5 entry. If the contents item does not have Text5 data then this entry should be 0.

Offset of Extra Text Entry

This 4 bytes entry represents the offset from the beginning of TEXT.HMT for first byte of Extra text entry. If the contents item does not have Extra text data then this entry should be 0.

The Group text entry Table includes a list of Group Text Entries (Table A7). There should be one Group Text Entry for each group in the playlist files listed in CONTENTS.HMT. The entries should be in the ascending group number order.

TABLE A7

Group Text Entry Format

| Offset | Length | Field Name |
|---|---|---|
| 0 | 4 | Group number |
| 4 | 4 | Offset of group name text entry |

Group Number

This 4 bytes entry represents the Group number for this Group text entry.

Offset of Group Name Text Entry

This 4 bytes entry represents the offset from the beginning of TEXT.HMT for first byte of Group name text entry. It is required that each group has a name.

The extra text entry table is defined as zero or more Extra Text Entries as defined in Table A8. The entries should be stored in ascending Contents ID order. If there are zero Extra Text Entries the Number of Extra Text Entries field, the Base offset of Extra Text Entries and the Base offset of Extra Text Data should all be 0.

TABLE A8

Extra Text Entry

| Offset | Length | Field Name |
|---|---|---|
| 0 | 4 | Contents ID |
| 4 | 1 | Number of Extra text data |
| 5 | 1 | Reserved |
| 6 | 2 | Type of 1$^{st}$ text data |
| 8 | 4 | Offset of 1$^{st}$ text entry |
| ... | | |
| 6 + 6 * (n − 1) | 2 | Type of n-th text data |
| 8 + 6 * (n − 1) | 4 | Offset of n-th text entry |

Contents ID

This 4 bytes entry represents of Contents ID of the file associated with this Extra text entry in CONTENTS.HMT.

Number of Extra Text Data

This 1 byte entry represents of number of Extra text data associated by this Extra text entry.

Reserved

This 1 byte entry is reserved for future use.

Type of n-th Text Data

This 2 byte entry contains one of the values defined in the table below.

TABLE A9

Type of n-th Text Data

| Extra Text Type | Value |
|---|---|
| 0 | UNUSED |
| 1 | LYRICS |
| 2 | COPYRIGHT |
| 3 | ALBUM ARTIST |
| 4-65,535 | RESERVED |

Offset of n-th Text Entry

This 4 bytes entry represents the offset from the beginning of TEXT.HMT for first byte of each Extra text entry.

What is claimed is:

1. A method of displaying menu information on a display associated with a media player, said menu information enabling a user to navigate one or more media files using the media player, said media files each having a media type associated therewith and being adapted for rendering by the media player as a function of the media type, said method comprising:

reading a menu header having references to one or more selected media files and a media type associated with each respective one of said selected media files, each of said media files being adapted for rendering by the media player as a function of the media type associated therewith;

adapting the read menu header by filtering the references to the selected media files as a function of a media type associated with the media player, wherein the media type associated with the media player identifies at least one media type that the player is capable of rendering; and displaying to a user on the display associated with the media player only menu information associated with the media player as indicated by the adapted menu header, wherein the displayed menu information enables a user to navigate among one or more media files using the media player.

2. The method of claim 1, wherein said menu header includes a reference to another menu header and a media type associated with said other menu header to enable navigation between the menu header and the other menu header, and further comprising adapting the read menu header by filtering the reference to the other menu header as a function of the media type associated with the media player.

3. The method of claim 1, wherein the media type associated with each respective one of the selected media files and the media type associated with the media player comprise one or more of the following: audio, video, and image.

4. The method of claim 1, wherein the references to the selected media files comprise one of the following: a memory location offset to the selected media files or a pointer to the selected media files.

5. The method of claim 1, wherein one or more computer-readable media have computer-executable instructions for performing the method recited in claim 1.

6. A consumer electronics device having a media player, said media player for displaying menu information on a display of the consumer electronics device, said menu information enabling a user to navigate one or more media files using a user interface of the consumer electronics device, said media files each having a media type associated therewith and being adapted for rendering by the media player as a function of the media type, said media player comprising:

an input module for reading a menu header having references to one or more selected media files and a media type associated with each respective one of said selected media files, wherein each of the media files is adapted for rendering by the media player as a function of the media type associated therewith;

a menu module for adapting the read menu header from the input module by filtering the references to the selected media files as a function of a media type associated with the media player, wherein the media type associated with the media player identifies at least one media type that the player is capable of rendering; and a user interface module for displaying to a user on the display of the consumer electronics device only menu information associated with the media player as indicated by the adapted menu header, said displayed menu information enabling a user to navigate among one or more media files using the user interface of the consumer electronics device.

7. The media player of claim 6, wherein said menu header includes a reference to another menu header and a media type associated with said other menu header to enable navigation between said menu header and the other menu header, and further comprising a navigation module for adapting the read menu header by filtering the reference to the other menu header as a function of the media type associated with the media player.

8. The media player of claim 7, wherein the references to the selected media files comprise one of the following: a memory location offset to the selected media files, a pointer to a playlist referencing the selected media files, or a pointer to the selected media files.

9. The media player of claim 7, wherein the media type associated with each respective one of the selected media files and the media type associated with the media player comprise one or more of the following: audio, video, and image.

10. The method of claim 1, further comprising populating the menu header with a reference to another menu header to enable navigation between the menu header and said other menu header.

11. The media player of claim 7, further comprising a summary module for identifying the media type associated with each of the selected media files.

* * * * *